(12) United States Patent
Ikeda

(10) Patent No.: US 9,452,352 B2
(45) Date of Patent: Sep. 27, 2016

(54) GAME SYSTEM FOR ENCOURAGING COMMUNICATION BETWEEN USERS

(71) Applicant: Ryuji Ikeda, Tokyo (JP)

(72) Inventor: Ryuji Ikeda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 95 days.

(21) Appl. No.: 13/717,443

(22) Filed: Dec. 17, 2012

(65) Prior Publication Data

US 2013/0260892 A1 Oct. 3, 2013

(30) Foreign Application Priority Data

Apr. 2, 2012 (JP) ................................. 2012-084039

(51) Int. Cl.
A63F 13/00 (2014.01)
A63F 13/30 (2014.01)
A63F 13/87 (2014.01)
A63F 13/45 (2014.01)
A63F 13/847 (2014.01)
A63F 13/822 (2014.01)

(52) U.S. Cl.
CPC .............. *A63F 13/12* (2013.01); *A63F 13/45* (2014.09); *A63F 13/822* (2014.09); *A63F 13/847* (2014.09); *A63F 13/87* (2014.09); *A63F 2300/5533* (2013.01)

(58) Field of Classification Search
CPC ...... A63F 13/005; A63F 13/12; A63F 13/31; A63F 13/50; A63F 13/87; A63F 2300/5533
USPC .................................................... 463/40–42
See application file for complete search history.

(56) References Cited

U.S. PATENT DOCUMENTS

| | | | |
|---|---|---|---|
| 7,765,266 B2* | 7/2010 | Kropivny | 709/206 |
| 8,128,498 B2* | 3/2012 | Aguilar et al. | 463/36 |
| 8,360,843 B2* | 1/2013 | Barclay et al. | 463/16 |

(Continued)

FOREIGN PATENT DOCUMENTS

| | | |
|---|---|---|
| JP | 2004-121420 | 4/2004 |
| JP | 2006-014952 | 1/2006 |

OTHER PUBLICATIONS

McBain, George. Achievments unlocked but not showing up here?. Xbox.com Forums [online]. Feb. 8, 2012 [retrieved on Sep. 11, 2014]. Retrieved from the Internet: <URL:http://forums.xbox.com/xbox_forums/xbox_support/xbox_360_support/f/8/p/202451/2544047.aspx>.*

Uncharted 2 dev talks Twitter [online]. Nov. 18, 2009 [retrieved on Sep. 11, 2014]. Retrieved from the Internet: <URL:http://www.gamespot.com/articles/uncharted-2-dev-talks-twitter/1100-6240728/>.*

(Continued)

*Primary Examiner* — Dmitry Suhol
*Assistant Examiner* — David Duffy
(74) *Attorney, Agent, or Firm* — Pillsbury Winthrop Shaw Pittman LLP

(57) ABSTRACT

One object is to provide a game that encourages the interaction between users forming a group and enhances the bond between the users. In accordance with one aspect, a server device of the present disclosure which is connected to terminal devices operated by the users via a communication network to provide a game to the terminal devices. The server device includes: an assignment unit for assigning, to each of the users belonging to the group, a certain event as a specific event from a plurality of events; and a notification unit for notifying, on occurrence of the specific event to an object user belonging to the group, the fact that the specific event has occurred, to the terminal device of at least one of the users belonging to the group, regardless of the intention of the object user.

8 Claims, 7 Drawing Sheets

(56) References Cited

U.S. PATENT DOCUMENTS

| | | | | |
|---|---|---|---|---|
| 8,460,099 | B2* | 6/2013 | Barclay et al. | 463/31 |
| 8,756,315 | B2* | 6/2014 | Alderucci et al. | 709/224 |
| 8,775,653 | B2* | 7/2014 | Lee et al. | 709/230 |
| 2005/0282635 | A1 | 12/2005 | Aoki | 463/42 |
| 2006/0003841 | A1 | 1/2006 | Kobayashi et al. | 463/42 |
| 2006/0135259 | A1* | 6/2006 | Nancke-Krogh et al. | 463/42 |
| 2006/0135261 | A1* | 6/2006 | Kinne et al. | 463/42 |
| 2007/0298886 | A1* | 12/2007 | Aguilar et al. | 463/42 |
| 2008/0026845 | A1* | 1/2008 | Aguilar et al. | 463/42 |
| 2008/0090659 | A1* | 4/2008 | Aguilar et al. | 463/42 |
| 2010/0062840 | A1* | 3/2010 | Herrmann | 463/25 |
| 2011/0269548 | A1* | 11/2011 | Barclay et al. | 463/42 |
| 2011/0281642 | A1* | 11/2011 | Hardy et al. | 463/25 |
| 2012/0083330 | A1* | 4/2012 | Ocko et al. | 463/23 |
| 2012/0083335 | A1* | 4/2012 | Ocko et al. | 463/31 |
| 2012/0295716 | A1* | 11/2012 | Lee et al. | 463/42 |
| 2012/0302342 | A1* | 11/2012 | Alderucci et al. | 463/31 |
| 2013/0260894 | A1* | 10/2013 | Graf et al. | 463/42 |
| 2013/0281190 | A1* | 10/2013 | Cage et al. | 463/25 |
| 2014/0004944 | A1* | 1/2014 | Lee et al. | 463/31 |

OTHER PUBLICATIONS

Taylor, Dave. How Do I Create a Private, Closed Facebook Group? [online]. Dec. 8, 2009 [retrieved on Sep. 11, 2015]. Retrieved from the internet: <URL: http://www.askdavetaylor.com/how_to_create_private_closed_facebook_group/>.*

"Certificate for Application of Provision of Exception to Lack of Novelty on Invention" with an English translation thereof, dated Apr. 12, 2012, Isao Moriyasu, http://dena.jp/press/2011/12/rpg12mobage.php, printed Apr. 18, 2012, 9 pages.

Japanese Office Action in connection with Japanese Patent Application No. 2012-084039 issued on Apr. 8, 2014 and English translation.

Non-Final Office Action as issued in Japanese Patent Application No. 2014-131225, dated May 31, 2016.

Maple Story Adventures, AppSTYLE, vol. 6, East Press Co., Ltd, Jan. 15, 2012, pp. 040-041.

White Knight Chronicles II, Light and Darkness' Awakening, Famitsu Connect!On, vol. 49, ENTERBRAIN Co. Ltd., Dec. 11, 2010, vol. 49, pp. 84-87.

* cited by examiner

GAME SYSTEM FOR ENCOURAGING COMMUNICATION BETWEEN USERS

CROSS-REFERENCE TO RELATED APPLICATIONS

This application is based on and claims the benefit of priority from Japanese Patent Application Serial No. 2012-084039 (filed on Apr. 2, 2012), the contents of which are hereby incorporated by reference in its entirety.

TECHNICAL FIELD

The present disclosure relates to a device for providing a game.

BACKGROUND

In a game in which multiple users participate, a bulletin board is used for the users to share information such as strategy, as described in Japanese Patent Application Publication No. 2006-14952 (the "'952 Publication"). For example, a user who has found a weakness of an enemy or a location of a treasure can write such information on the bulletin board for notification to other users.

SUMMARY

In such a conventional game as disclosed in the '952 Publication, a bulletin board can facilitate the interaction between users to some extent but does not sufficiently enhance the bond between the users.

In view of the above limitations, provided herein is a novel game in accordance with some aspects of the present disclosure for encouraging interactions between users in a group and enhancing bonds between the users.

A server device according to one embodiment of the present disclosure provides one or more games via a communication network to terminal devices, the server device comprising: an assignment unit configured to assign a certain event as a specific event from a plurality of events to each of users belonging to a group; and a notification unit configured to notify, on occurrence of the specific event to an object user belonging to the group, the fact that the specific event has occurred, to the terminal device associated with at least one of the users belonging to the group, regardless of an intention of the object user.

A game system according to one embodiment of the present disclosure includes: terminal devices each to be operated by a user; and a server device which is connected to the terminal devices via a communication network and is configured to provide a game to the terminal devices, the server device comprising: an assignment unit for assigning, to each of the users belonging to a group, a certain event as a specific event from a plurality of events; and a notification unit for notifying, on occurrence of the specific event to an object user belonging to the group, the fact that the specific event has occurred, to the terminal device of at least one of the users belonging to the group, regardless of an intention of the object user.

A game program according to one embodiment of the present disclosure causes a computer to operate as: a management unit for managing a group to which users belong; an assignment unit for assigning, to each of the users belonging to the group, a certain event as a specific event from a plurality of events; and a notification unit for notifying, on occurrence of the specific event to an object user belonging to the group, the fact that the specific event has occurred, to a terminal device of at least one of the users belonging to the group, regardless of an intention of the object user. A server device according to one embodiment of the present disclosure provides one or more games via a communication network to a plurality of terminal devices, the server device comprising: an event setting unit configured to associate at least one of a plurality of events with one or more of a plurality of users belonging to a group; and a notification unit configured to notify, on occurrence of said at least one of the plurality of events to an individual one of said one or more of the plurality of users associated with said at least one of the plurality of events, the fact that said at least one of the plurality of events has occurred, to one or more of the plurality of terminal devices each associated with one of the users belonging to the group, regardless of an intention of said individual one of said users.

The embodiments of the present disclosure provide a game for encouraging interactions between users forming a group and enhancing the bonds between the users.

BRIEF DESCRIPTION OF THE DRAWINGS

Various embodiments of the present disclosure will be described below with reference to the appended drawings. In the drawings, the same elements are denoted by the same reference numerals.

Embodiment 1

Figure 1:
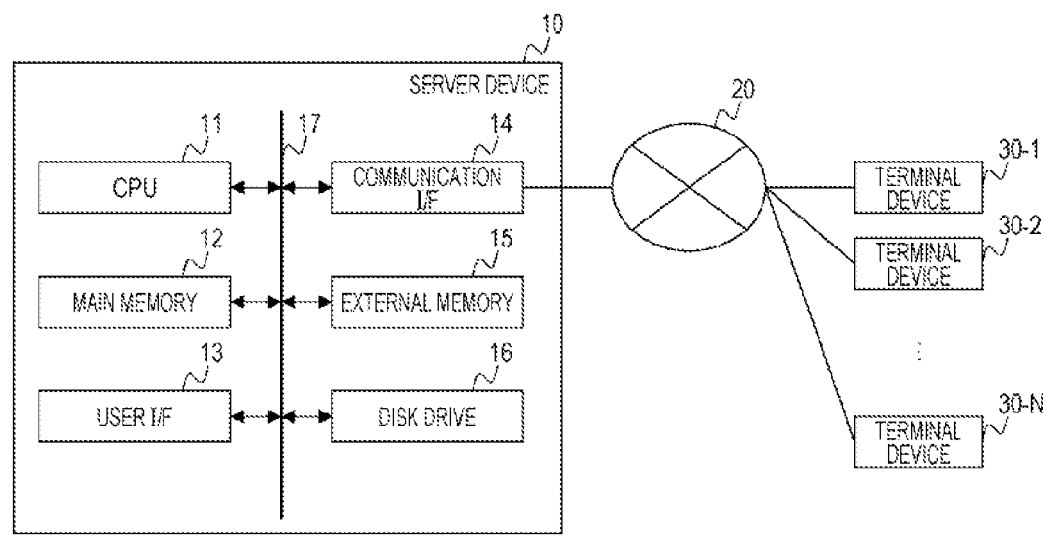
FIG. 1 is a block diagram schematically showing the architecture of a game system according to Embodiment 1 of the present disclosure.

FIG. 1 is a block diagram schematically illustrating the architecture of a game system according to Embodiment 1 of the present disclosure. As illustrated in FIG. 1, in an embodiment of the present disclosure, an online gaming server device 10 (hereinafter also referred to simply as the "server device 10") is communicatively connected, via a communication network 20 such as the Internet, to a plurality of terminal devices 30-1, 30-2, . . . , and 30-N (hereinafter also collectively referred to as the "terminal devices 30" or each individually as the "terminal device 30"), each having a communication function.

As illustrated in FIG. 1, the server device 10 includes a central processing unit (CPU) 11, a main memory 12, a user interface (I/F) 13, a communication I/F 14, an external memory 15, and a disk drive 16, and these components are electrically connected to one another via a bus 17. The CPU 11 loads an operating system and various programs for controlling the progress of an online game onto the main memory 12 from the external memory 15, and executes commands included in the loaded programs. The main memory 12 is used to store a program to be executed by the CPU 11, and is formed of, for example, a dynamic random access memory (DRAM).

The user I/F 13 includes, for example, an information input device including a keyboard, a mouse, and the like through which an operator enters an input, and an information output device including a liquid crystal display and the like through which calculation results of the CPU 11 are output. The communication I/F 14 is implemented as hardware, firmware, or communication software such as a transmission control protocol/Internet protocol (TCP/IP) driver or a point-to-point protocol (PPP) driver, or a combination thereof, and is configured to be able to communicate with the terminal devices 30 via the communication network 20.

The external memory 15 is formed of, for example, a magnetic disk drive, and stores various programs such as a game program for allowing the terminal device 30 to execute an online game and a control program for controlling the progress of the online game. The game program is created using, for example, Adobe Flash (registered trademark), which is a format developed by Adobe Systems Incorporated to handle moving images, games, and the like. The game program created using Adobe Flash (registered trademark) is stored in the external memory 15 as a small web format (SWF) file. The game program will be described below. The disk drive 16 reads data stored in a storage medium such as a compact disc read only memory (CD-ROM), digital versatile disc read only memory (DVD-ROM), or DVD Recordable (DVD-R) disc, or writes data to such a storage medium. For example, data of a game program or the like stored in a storage medium is read by the disk drive 16, and is installed into the external memory 15. Additionally, the external memory 15 stores identification information of a group to which a user belongs, and status information of a character corresponding to the user, such as current level, offensive power, defensive power, life, and possessed money, equipment, and items, with the user ID associated with the information.

The terminal device 30 may be any information processing device capable of executing and operating a game stored in the server device 10, such as a mobile phone, a smartphone, a game console, a personal computer, a tablet, or an electronic book reader, and displayed on a web browser. Additionally, the terminal device 30 can receive a game program from the server device 11 via the communication I/F 34 (described later) to perform the game. An architecture common to these various terminal devices 30 will be described below with reference to FIG. 2.

Figure 2:
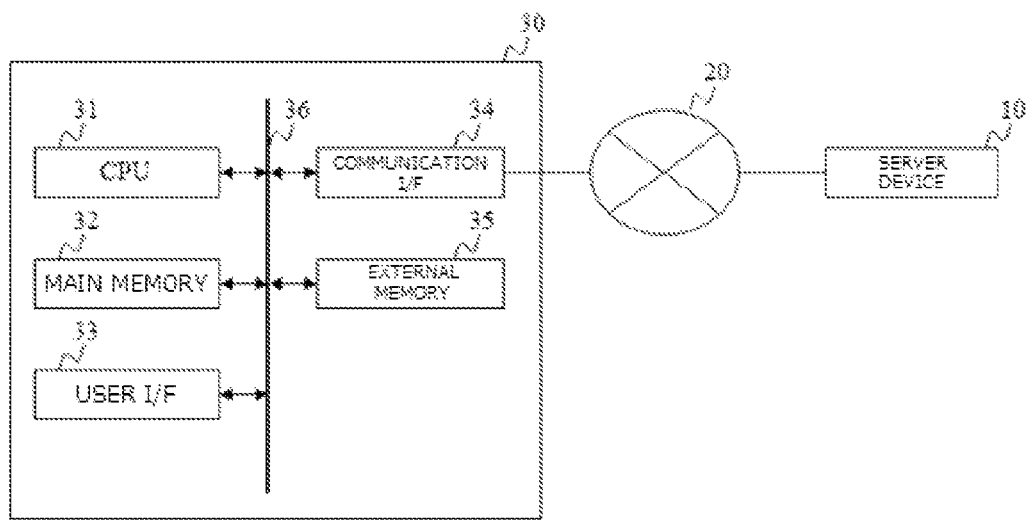
FIG. 2 is a block diagram conceptually showing the architecture of a terminal device 30 according to Embodiment 1 of the present disclosure.

FIG. 2 is a block diagram conceptually showing the architecture of a terminal device 30 according to Embodiment 1 of the present disclosure. As show in the figure, the terminal device 30 includes a CPU 31, a main memory 32, a user I/F 33, a communication I/F 34, and an external memory 35. These components are electrically connected to each other via a bus 36.

The CPU 31 loads various programs such as an operating system from the external memory 35 onto the main memory 32, and executes the instructions included in the loaded program. The main memory 32 is used to store programs to be executed by the CPU 31 and is constituted, for example, by D-RAM.

The user I/F 33 includes, for example, an information input device including a tablet, a keyboard, a button, a mouse, and the like through which a player (user) enters an input, and an information output device including a liquid crystal display and the like through which calculation results of the CPU 31 are output. The communication I/F 34 is implemented as hardware, firmware, or communication software such as a transmission control protocol/Internet protocol (TCP/IP) driver or a point-to-point protocol (PPP) driver, or a combination thereof, and is configured to be able to communicate with the server device 10 via the communication network 20.

The external memory 35 is constituted by, for example, a magnetic disk drive or a flash memory, and stores various programs such as an operating system. Additionally, the external memory 35 executes a game program received from the server device 10 via the communication I/F 34.

The terminal device 30 having such an architecture has, for example, browser software for interpreting a hypertext markup language (HTML) file and displaying a screen, and plug-in software (e.g., Flash Player distributed by Adobe Systems Incorporated) incorporated in the browser software. The terminal device 30 acquires an SWF file embedded in an HTML file from the server device 10, and executes the SWF file using the browser software and plug-in software, and therefore the user of the terminal device 30, or a game player, may be provided with a gaming function.

Next, a game program will be described below with reference to FIGS. 1 and 2.

The game program is stored in the server device 10 in various forms. For example, the game program may be provided as a piece of application software executable on various application execution platforms. The player is able to execute or operate a game application using the terminal device 30.

The external memory 15 of the server device 10 stores game programs for executing or operating various games executable or operable on the terminal device 30. The game programs may be created using, for example, script languages such as ActionScript and JavaScript, both of which are registered trademarks, or object-oriented programming languages such as Objective-C and Java, both of which are registered trademarks. The game programs are executed or operated on a platform installed on the terminal device 30. A game program to be stored in the external memory 15 may be produced by modifying a web page created in a markup language such as HTML5 by using a style sheet such as Cascading Style Sheet 3 (CSS3). Such a web page created in a markup language is executed or operated by the browser software installed on the terminal device 30. The external memory 15 of the server device 10 may store a desired number of game programs, and a game program for executing or operating a game selected by the terminal device 30 is provided to a desired number of terminal devices 30 via the communication I/F 14 in accordance with control of the CPU 11. In the terminal device 30, a game program sent by the server device 10 is sent onto the external memory 35 for storage via the communication I/F 34 in accordance with control of the CPU 31.

The terminal device 30 may execute or operate the game program to play various games such as action games, role-playing games, baseball interactive games, and card games. The games implemented by the game program are not limited to those explicitly disclosed herein. When a game is executed, for example, animation or an operation icon designated by the program is displayed on a screen of the terminal device 30. The player may enter an instruction for causing the game to progress using an input interface (e.g., a touch screen or a button) of the terminal device 30. The instruction entered by the player is transmitted to the server device 10 through the browser of the terminal device 30 or a platform function such as NgCore (registered trademark). The terminal device 30 sends information indicating various parameters (such as the number of game points earned and information concerning obtained items), which is used in the game, and information indicating the status of the game (such as information specifying which mission has been fulfilled) to the server device 10, if necessary. The server device 10 manages the progress of the individual players in the game in accordance with information received from the plurality of terminal devices 30, such as instructions, information indicating the parameters, and information indicating the statuses. Thus, each player is able to resume the interrupted game from the point where it was interrupted, on the basis of the information concerning the progress of the game held in the server device 10.

Figure 3:
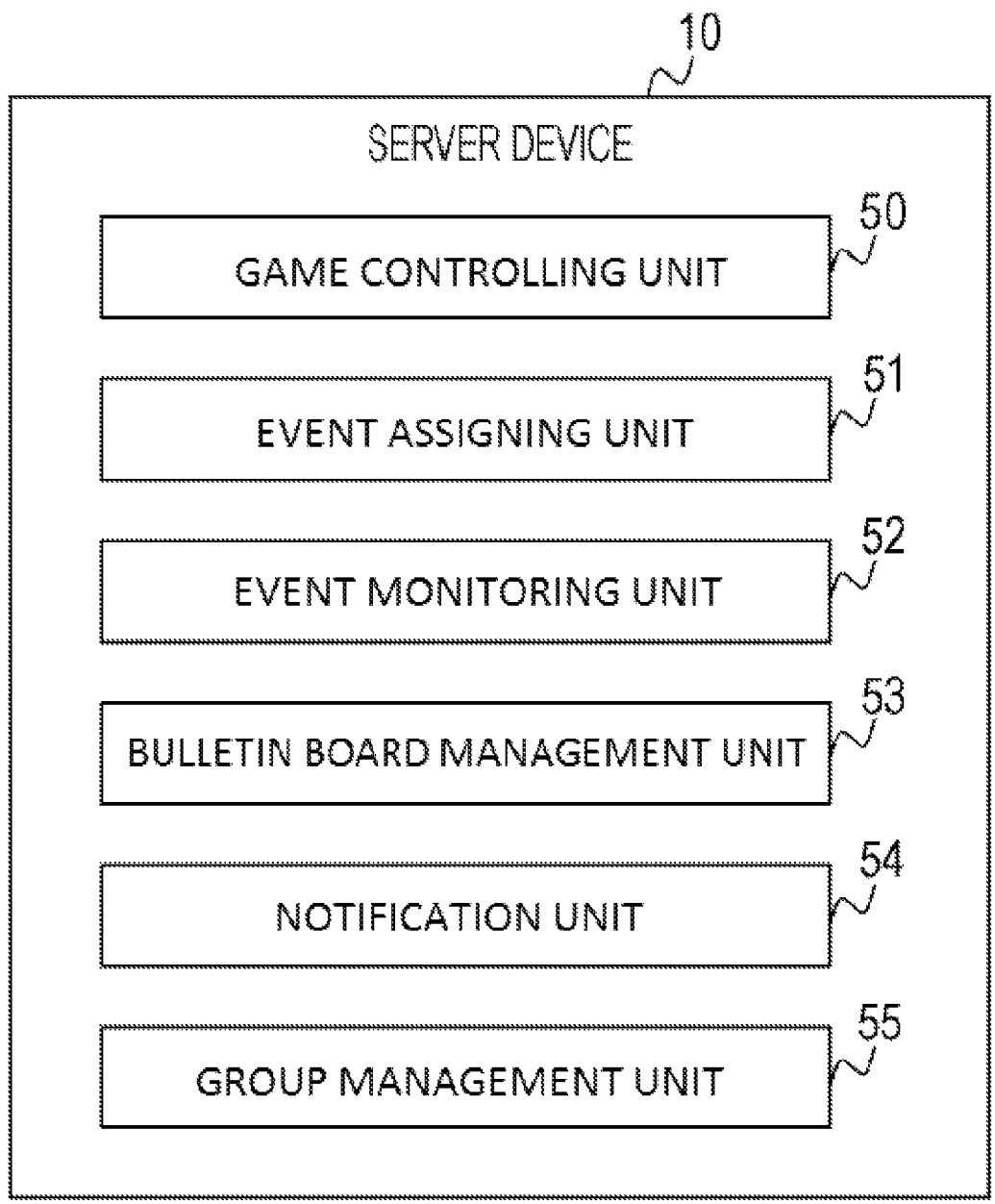
FIG. 3 is a block diagram showing the function of a server device 10 according to Embodiment 1 of the present disclosure.

Next, a function of the server device 10 implemented by the components shown in FIG. 1 will be described below with reference to FIG. 3. FIG. 3 is a block diagram showing the function of a server device 10 according to Embodiment 1 of the present disclosure.

As shown in FIG. 3, the server device 10 according to the embodiment includes a game controlling unit 50, an event assigning unit 51, an event monitoring unit 52, a bulletin board management unit 53, a notification unit 54, and a group management unit 55.

The game controlling unit 50 progresses a game in which users belonging to a same group cooperate with each other. In the embodiment, the game controlling unit 50 controls the game such that the users belonging to the same group cooperate with each other to perform a fight against a boss character. The algorithm for determining the number of damages made on the boss character and the number of damages received from the boss character can make determinations by comparing, for example, the parameters indicating the attributes of a character corresponding to each user taking part in the fight (represented in various terms such as offensive power and defensive power) with the same parameters of the boss character. The game controlling unit 50 gives an item or others to users belonging to a group which has beaten the boss character first or a group which has made many damages on the boss character.

The event assigning unit 51 assigns, to each user belonging to a group, a certain event as a specific event from a plurality of events. For example, the event assigning unit 51 assigns, to all the users belonging to a group, common events such as event A (finding a strategy for beating boss character A), event B (finding a strategy for beating boss charater B), event C (finding a strategy for beating boss charater C), event D (finding treasure D), event E (finding treasure E), event F (finding item F), and event G (finding item G). For further example, from these events, the event assigning unit 51 assigns, to each user, events A, B and events D, E as "specific events." The event assigning unit 51 is also referred to as an event setting unit, configured to associate at least one of a plurality of events with one or more of a plurality of users belonging to a group The event monitoring unit 52 constantly monitors whether or not a specific event assigned by the event assigning unit 51 has occurred to any user belonging to a group and, when it has occurred, the event monitoring unit 52 notifies the notification unit 54 that the specific event has occurred.

The bulletin board management unit 53 manages a bulletin board accessible to the terminal devices 30 of a plurality of users. More specifically, the bulletin board management unit 53 writes on the bulletin board a message received from a terminal device 30 of a user and deletes from the bulletin board a message indicated by a terminal device 30 of a user. Additionally, the bulletin board management unit 53 writes on the bulletin board a message indicated by the notification unit 54. In the embodiment, the bulletin board managed by the bulletin board management unit 53 is accessible only to users belonging to a certain group; but instead, the bulletin board may be accessible to all the users. Further, this bulletin board may be open only to a specific topic (e.g., a topic concerning boss character A).

When notified from the event monitoring unit 52 that a specific event has occurred to a user, the notification unit 54 writes, on the bulletin board managed by the bulletin board management unit 53, the fact that the specific event has occurred to the user.

The group management unit 55 organizes users registered for a game into a plurality of groups, and manages the correspondence between the users and the groups in accordance with this organization. For example, when one of the games implemented by game programs is performed on the terminal device 30 of a user for the first time, the group management unit 55 registers the user ID of the user and enters the user ID into one or more groups. More specifically, the group management unit 55 stores, on the external memory 15, the user ID associated with the identification information of a group to which the user belongs. The group to which the user belongs may be changed by an instruction inputted by the user into the terminal device 30.

Figure 4:
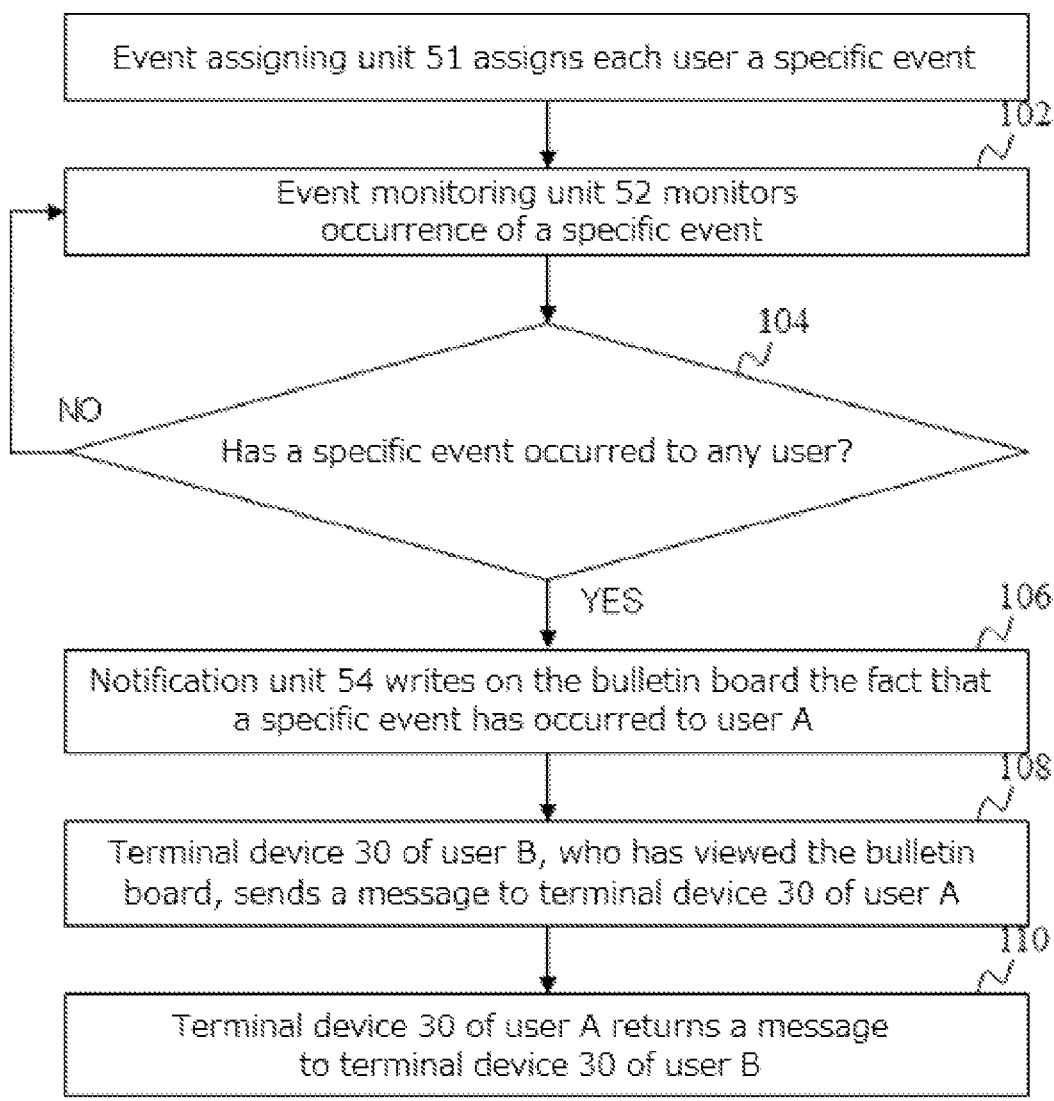
FIG. 4 is a flow chart showing an example of the operations of the game system according to Embodiment 1 of the present disclosure.

FIG. 4 is a flow chart showing an example of operations of the game system according to Embodiment 1 of the present disclosure. In step (hereinafter "ST") 100, the event assigning unit 51 of the server device 10 assigns, to each user belonging to a certain group (e.g., group X), a specific event from a plurality of events. In ST102, the event monitoring unit 52 monitors whether or not the specific event has occurred to any user belonging to the group X. When the event monitoring unit 52 recognizes, in ST104, that the specific event (e.g., specific event A) has occurred to a user (e.g., user A) in group X, the processing proceeds to ST106.

In ST106, the event monitoring unit 52 notifies the notification unit 54 that the specific event A has occurred to user A. The notification unit 54 writes, on the bulletin board managed by the bulletin board management unit 53 and accessible only to the users belonging to group X, the fact Y that the specific event A has occurred to user A. The fact Y, therefore, is known to each of the users belonging to group X who has accessed this bulletin board. The operation of the notification unit 54 to write the fact Y on the bulletin board is equivalent to notification of the fact Y to each user belonging to group X via the bulletin board Additionally, the operation of the notification unit 54 to write the fact Y on the bulletin board is performed without permission by user A; that is, this operation is performed compulsorily regardless of the intention of the user.

On the bulletin board, the fact Y that the specific event A (the event of finding a strategy for beating boss character A) has occurred to user A is written. Therefore, a user belonging to group X who has accessed the bulletin board (e.g., user B) recognizes the fact that user A has found a strategy for beating boss character A, but does not know the details of the strategy. To know the details of the strategy, user B needs to inquire of user A. In ST108, user B sends to user A a message, for example, "Tell me the strategy for beating boss character A," through the standard message communication function provided to the game currently performed. For this message, regular messages prepared in advance by the server device 10 can also be substituted. Sending of such a message can be implemented through a publicly known message communication function ordinarily provided to an online game.

In ST110, in response to the message received from user B, user A returns to user B a message describing the strategy such as "Shoot missiles to boss character A successively for five seconds and then throw three types of bombs in order; then, you can unshield boss character A." When receiving a message from user B, user A can send details of the strategy to user B by selecting a regular message or without any operation.

Thus, in the embodiment, the fact Y that the specific event A has occurred to user A belonging to group X is notified, on occurrence of the event, to each user belonging to group X through the bulletin board. Each user belonging to group X is only notified of the fact Y that the specific event A has occurred to user A and is not notified of the details of the specific event A. Each user, therefore, frequently sends a message to user A for the specific event A, and user A frequently returns a message to each user, thereby enhancing the bond between the users belonging to group X. Further, the operation of writing the fact Y on the bulletin board, or the operation of notifying the fact Y to each user belonging to group X is compulsorily performed regardless of the intention of user A; therefore, sending and receiving of messages between the users, that is, interactions between the users, is steadily facilitated.

Embodiment 2

For this embodiment, an example will be described of how the fact that a specific event has occurred to a user is written on a user-specific page to notify the fact to each user. The description of the configuration and operation of the embodiment will be focused on the difference from those of Embodiment 1 (the configuration and operation common to the embodiment and Embodiment 1 will be omitted in the description below).

Figure 5:
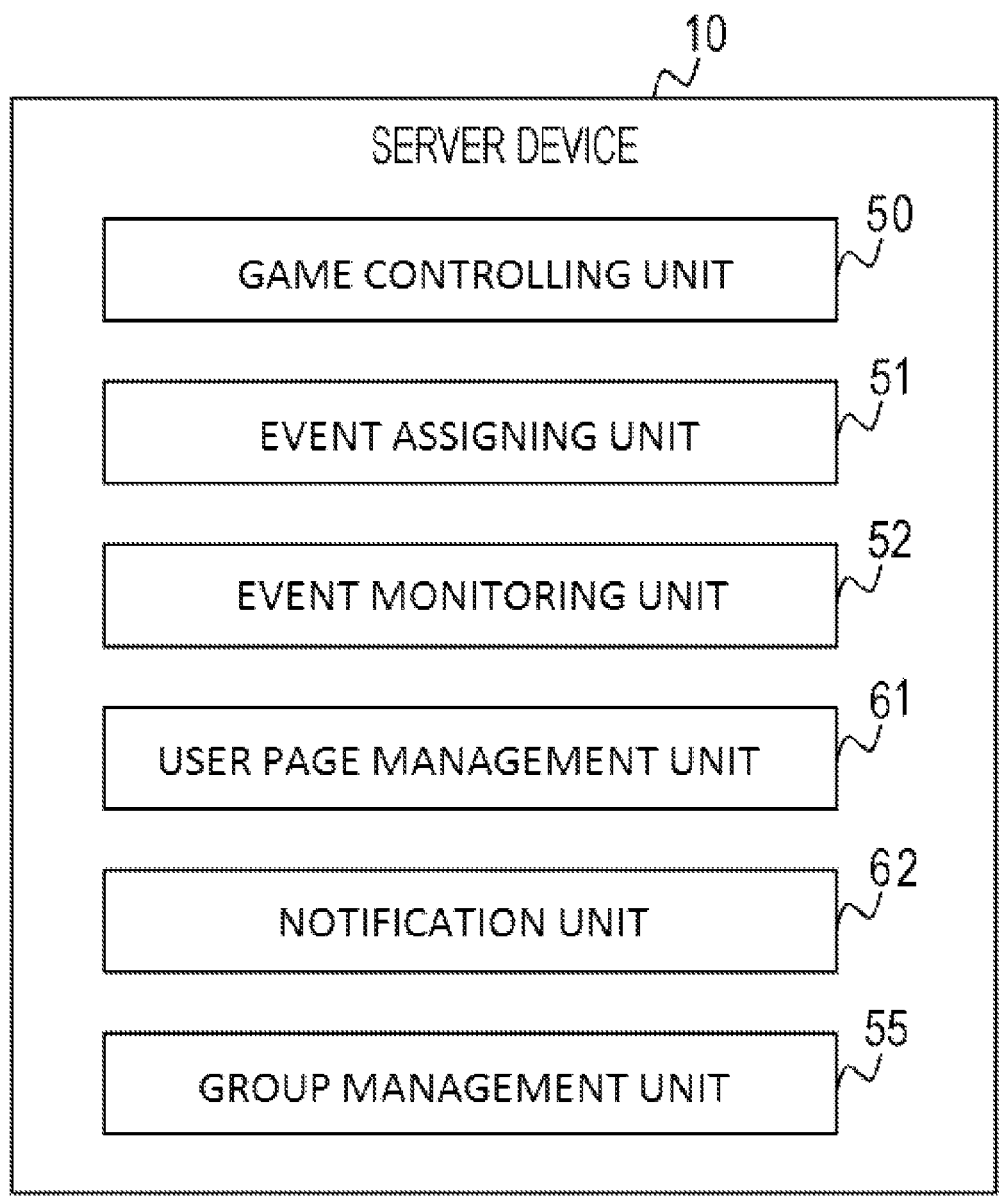
FIG. 5 is a block diagram showing a function of the server device 10 according to Embodiment 2 of the present disclosure.

FIG. 5 is a block diagram showing a function of the server device 10 according to Embodiment 2 of the present disclosure. A user page management unit 61 manages a page specific to each of the users belonging to group X (hereinafter referred to as "user page"). Each user can view the user page specific to the user on a screen through a predetermined operation while performing the game. The user page shows, for example, the current status of the user (e.g., level, offensive power, defensive power, life, and possessed money, equipment, and items). In the embodiment, the user page further shows the fact described for Embodiment 1 (the fact in Embodiment 1 which is written on the bulletin board accessible only to the users belonging to the group).

When notified by the event monitoring unit 52 that a specific event has occurred to a user, the notification unit 62 writes, on a user page managed by the user page management unit 61, the fact that the specific event has occurred to the user.

Figure 6:
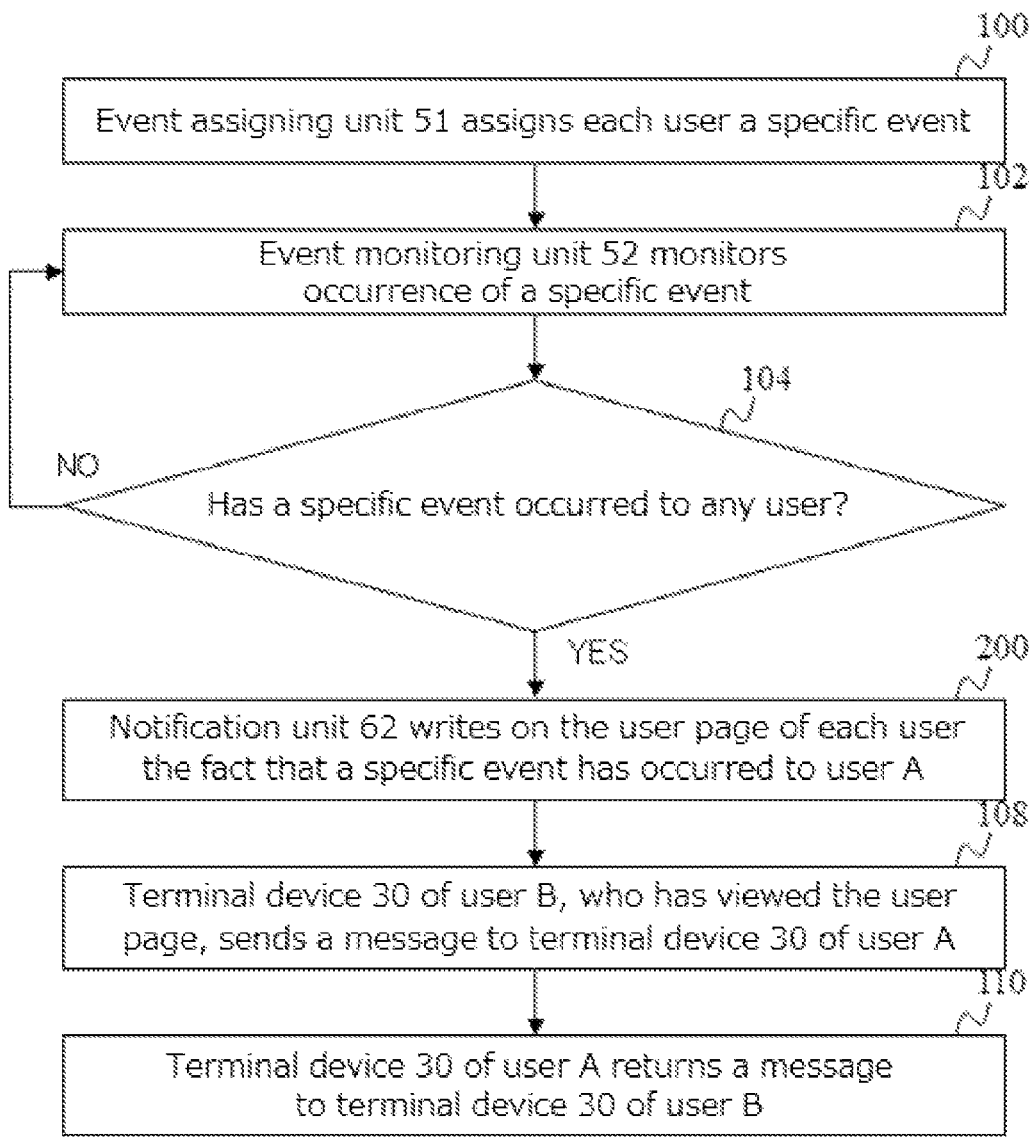
FIG. 6 is a flow chart showing an example of operations of the game system according to Embodiment 2 of the present disclosure.

FIG. 6 is a flow chart showing an example of operations of the game system according to Embodiment 2 of the present disclosure. FIG. 6 is different from FIG. 4 according to Embodiment 1 only in ST200. In ST200, when notified by the event monitoring unit 52 of the fact Y that a specific event has occurred to user A, the notification unit 62 writes the fact Y on the user page of each of the users belonging to group X managed by the user page management unit 61. Thus, the fact Y is known to each of the users belonging to group X. The operation of the notification unit 62 to write the fact Y on a user page is equivalent to notification of the fact Y to each of the users belonging to group X via the user page. Subsequently, in ST108, each user (e.g., user B) sends a message to user A to inquire the details of the specific event, as described above.

The notification unit 62 may send a message indicating the fact Y to each of the users belonging to group X, instead of writing the fact Y on the user page of each of the users belonging to group X. Sending of such a message can be implemented by a publicly known message sending function ordinarily provided to an online game.

Thus, in the embodiment, the fact Y that a specific event A has occurred to user A belonging to group X is notified, on occurrence of the event, to each user belonging to group X through the user page of the user or a message directly sent to the user. Each user belonging to group X is only notified of the fact Y that the specific event A has occurred to user A and is not notified of the details of the specific event A. Each user, therefore, frequently sends a message to user A for the specific event A, and user A frequently returns a message to each user, thereby enhancing the bond between the users belonging to group X. Further, the operation of writing the fact Y on the user page of each user or the operation of sending a message indicating the fact Y to each user, that is, the operation of notifying the fact Y to each user belonging to group X is compulsorily performed regardless of the intention of user A; therefore, sending and receiving of messages between the users, that is, interactions between the users, is steadily facilitated.

Embodiment 3

For this embodiment, an example will be described of how the timing is varied at which the fact that a specific event has occurred to a user is notified to each user in Embodiments 1 and 2 above. The description of the configuration and operation of the embodiment will be focused on the difference from those of Embodiments 1 and 2 (the configuration and operation common to the embodiment and Embodiments 1 and 2 will be omitted in the description below).

Figure 7:
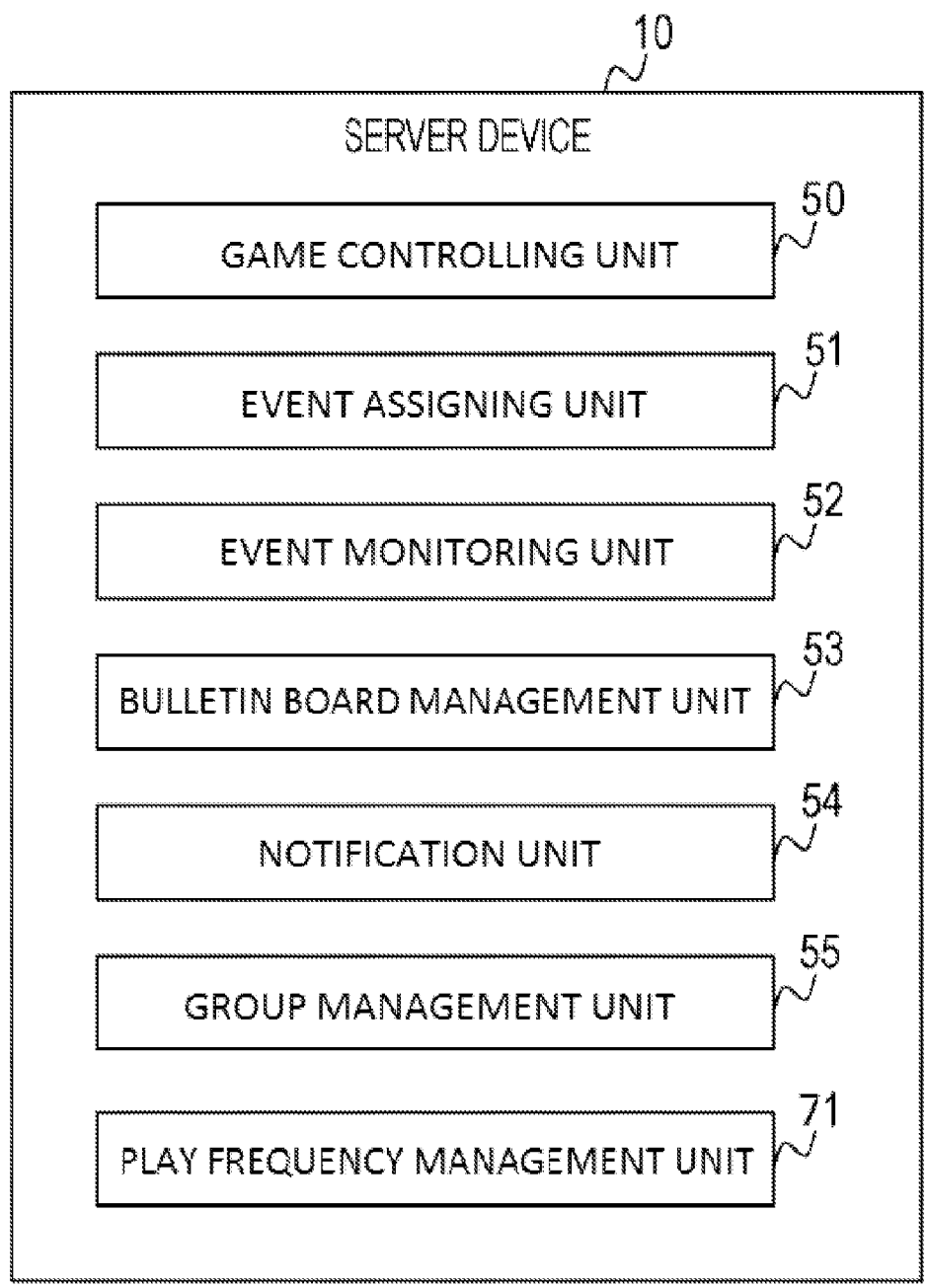
FIG. 7 is a block diagram showing a function of the server device 10 according to Embodiment 3 (the server device 10 based on Embodiment 1) of the present disclosure.
Figure 8:
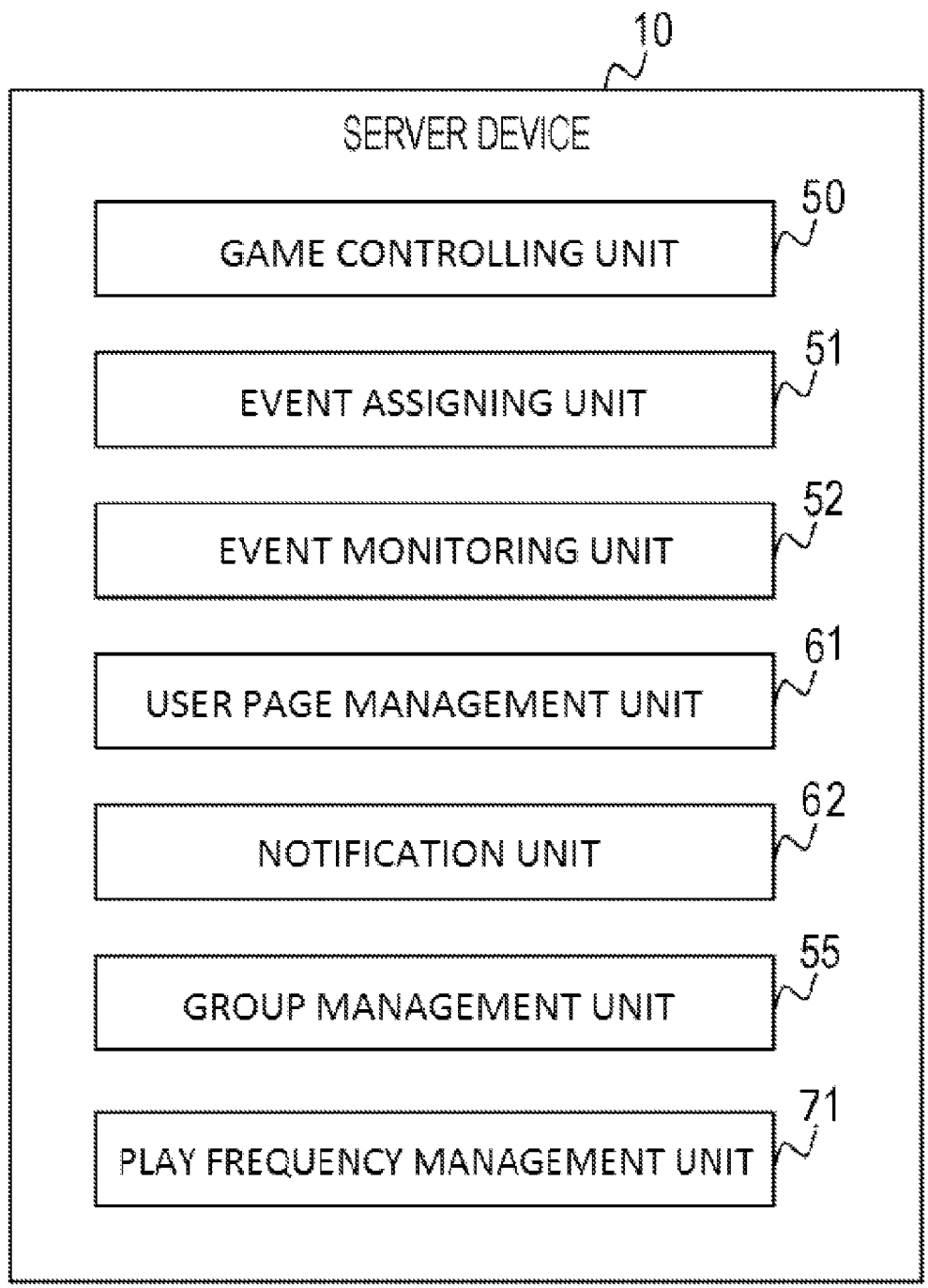
FIG. 8 is a block diagram showing (another example of) a function of the server device 10 according to Embodiment 3 (the server device 10 based on Embodiment 2) of the present disclosure.

FIG. 7 is a block diagram showing a function of the server device 10 according to Embodiment 3 (the server device 10 based on Embodiment 1) of the present disclosure. FIG. 8 is a block diagram showing (another example of) a function of the server device 10 according to Embodiment 3 (the server device 10 based on Embodiment 2) of the present disclosure.

A play frequency management unit 71 manages the frequency of playing the game for each user belonging to group X. The play frequency may be either the frequency of playing one or more games or the frequency of using a message communication function for exchanging messages with other users.

When notified from the event monitoring unit 52 of the fact Y that a specific event A has occurred to user A, the notification unit 54 shown in FIG. 7 may vary the time period (hereinafter referred to as "waiting time") from the point when the specific event A occurred to user A to the point where the fact Y is written on a bulletin board, in accordance with the frequency of playing the game of user A (the play frequency managed by the play frequency management unit 71). Likewise, the notification unit 62 shown in FIG. 8 also can vary the waiting time from the point where a specific event A occurred to the point where the fact Y is written on a user page of each user or a message indicating the fact Y is sent to each user, in accordance with the frequency of playing the game of user A.

More specifically, when the frequency of playing the game of user A is low, the notification unit 54 (the notification unit 62) may shorten the waiting time in order to encourage user A to play the game more frequently. In particular, when the frequency of using a message communication function of user A is low, that is, user A does not frequently exchange messages with other users, the notification unit 54 (the notification unit 62) may shorten the waiting time. Thus, user A, who plays the game less frequently (or uses the message communication function less frequently), receives more inquiries from other users. Accordingly, interaction between user A and other users is effectively encouraged.

In contrast, when the frequency of playing the game of user A is high, the notification unit 54 (notification unit 62) may prolong the waiting time. This operation is effective when the communication line between each terminal device and the server device is busy.

Alternatively, the notification unit 54 (the notification unit 62) may vary the number of times that the fact Y that a specific event has occurred to user A is notified to each user in accordance with the frequency of playing the game of user A. For example, when the frequency of using a message communication function of user A is low, that is, user A does not frequently exchange messages with other users, the number of times that the notification unit 54 (the notification unit 62) notifies the same fact Y to each user may be increased (for example, the same fact Y may be sent to each user three times at certain intervals). Thus, user A, who plays the game less frequently (or uses the message communication function less frequently) receives more inquiries from other users. Accordingly, interaction between user A and other users is effectively encouraged.

Further, when notified from the event monitoring unit 52 of the fact Y that a specific event A has occurred to user A, the notification unit 54 (the notification unit 62) may vary, for each user, the waiting time from the point when the specific event A occurred to user A to the point where the fact Y is notified to each user. For example, the notification unit 54 (the notification unit 62) may notify the fact Y 10 minutes later to user B belonging to group X, 20 minutes later to user C belonging to group X, and 30 minutes later to user D belonging to group X. These waiting times may be varied in accordance with the frequencies of playing the game of users A, B, and C, or the like. For example, among the users (belonging to group X) to be notified of the fact Y, user D may be assigned a shorter waiting time than other users for the reason that user D plays the game or uses the message communication function less frequently and should play the game or use the function more frequently.

Embodiment 4

For this embodiment, another example will be described of how the timing is varied at which the fact that a specific event has occurred to a user is notified to each user in Embodiments 1 to 3. The description of the configuration and operation of the embodiment will be focused on the difference from those of Embodiments 1 to 3 (the configuration and operation common to the embodiment and Embodiments 1 to 3 will be omitted in the description below).

The event assigning unit 51 may vary the specific event for each user in accordance with the frequency of playing the game of the user. For example, the event assigning unit 51 may assign, to user A, who plays the game less frequently, all the events A to G described above as specific events, and assign, to user B, who plays the game frequently, only the events A and B, among the events A to G described above, as specific events. In this case, the specific events occur more frequently for user A (assigned seven specific events) than for user B (assigned two specific events). As a result, it is likely that that fact that a specific event has occurred to user A is more frequently notified to other users. Thus, interaction between user A, who plays the game less frequently, and other users is effectively encouraged.

The processes and procedures described and illustrated herein are implemented by software, hardware, or any combination thereof, as well as that explicitly stated in the embodiments. More specifically, the processes and procedures described and illustrated herein are implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

If the processes and procedures has been described and illustrated herein to be executed by a single device, software, component, or module, such processes or procedures may also be executed by a plurality of devices, a plurality of pieces of software, a plurality of components, and/or a plurality of modules. The data, table, or database described and illustrated herein to be stored in a single memory may also be distributed to and stored in a plurality of memories included in a single device or a plurality of memories which are located in a plurality of devices in a distributed manner. Furthermore, the software and hardware elements described and illustrated herein may also be integrated into a smaller number of constituent elements or separated into a larger number of constituent elements.

What is claimed is:

1. A device for providing a game via a communication network to a plurality of terminals, the device comprising:
   a central processing unit configured to execute machine-readable instructions;
   memory storage configured to store machine-readable instructions, when executed, causing the central processing unit to provide the game to the plurality of terminals associated with a group of users playing the game, wherein providing the game to the plurality of terminals comprises:
   assigning a specific event selected from a plurality of events to the group of users;
   monitoring whether the specific event has occurred to a first user of the group;
   when it is determined that the specific event has occurred to the first user,
      determining a number of times of notifying the group of users a fact of the occurrence based on a frequency of interactions between the first user and the game; and
      notifying the group of users by sending the fact of the occurrence to the plurality of terminals in the number of times, which causes at least one of the plurality of terminals associated with a second user to send an inquiry to the terminal associated with the first user for content of the fact in response to the notification.

2. The device of claim 1, wherein providing the game to the plurality of terminals further comprises:
increasing the number of times of notifying the group of users the fact of the occurrence if the frequency of interactions between the first user and the game is low.

3. The device of claim 1, wherein providing the game to the plurality of terminals further comprises:
decreasing the number of times of notifying the group of users the fact of the occurrence if the frequency of interactions between the first user and the game is high.

4. The device of claim 1, wherein providing the game to the plurality of terminals further comprises:
assigning one or more events to each user in the group, wherein a number of the one or more events assigned to each user is determined based on a respective frequency of the each user interacting with the game.

5. A device for providing a game via a communication network to a plurality of terminals, the device comprising:
a central processing unit configured to execute machine-readable instructions;
memory storage configured to store machine-readable instructions, when executed, causing the central processing unit to provide the game to the plurality of terminals associated with a group of users playing the game, wherein providing the game to the plurality of terminals comprises:
assigning a specific event selected from a plurality of events to the group of users;
monitoring whether the specific event has occurred to a first user of the group;
when it is determined that the specific event has occurred to the first user,
determining for each other user in the group, a time period from a point of the occurrence to a point of notifying the each other user a fact of the occurrence based on a frequency of interactions between the each other user and the game; and
notifying the each other user the fact of the occurrence in accordance with the time period, which causes at least one of the plurality of terminals associated with a second user to send an inquiry to the terminal associated with the first user for content of the fact in response to the notification.

6. The device of claim 5, wherein notifying the each other user the fact of the occurrence in accordance with the time period further comprises:
posting the fact of the occurrence on a user page of the each other user in accordance with the time period.

7. The device of claim 5, wherein notifying the each other user the fact of the occurrence in accordance with the time period further comprises:
sending the fact of the occurrence to the each other user in accordance with the time period.

8. The device of claim 5, wherein the time period with respect to the each other user in the group varies in accordance with the respective frequency of interactions between the each other user and the game.

* * * * *